United States Patent Office 2,885,450
Patented May 5, 1959

2,885,450

MANUFACTURE OF FLUOROHALOMETHANES

Cyril Woolf, Morristown, N.J., assignor to Allied Chemical Corporation, New York, N.Y., a corporation of New York No Drawing. Application November 20, 1956
Serial No. 623,304

7 Claims. (Cl. 260—653.8)

This invention is directed to processes for making perhalogenated bromofluoromethanes.

More particularly, the present improvements relate to manufacture of $CF_2ClBr$ and $CF_2Br_2$ from sym-tetrafluorodichloroacetone and elemental bromine as starting materials. Objects of the invention include provision of vapor-phase methods for making the indicated perhalogenated bromofluoro methanes in conjunction with production of $CCl_2F_2$ as by-product. The perhalogenated bromofluoromethanes are known fire-extinguishing agents, and $CCl_2F_2$ is commonly employed as a refrigerant.

According to the invention, it has been found that when sym-tetrafluorodichloroacetone is subjected to heat at certain temperatures in the presence of elemental bromine, the principal sought-for products $CF_2BrCl$ and $CBr_2F_2$ may be obtained in good yields. It has been ascertained, contrary to any expectancy based on known prior art, that under the herein described reaction conditions, the action of bromine on sym-tetrafluorodichloroacetone is such as to effect substantially complete disunion of the carbon atoms of the sym-tetrafluorodichloroacetone resulting in the splitting out of the CO group, and formation of the methanes, $CF_2ClBr$, $CBr_2F_2$, and $CCl_2F_2$.

Sym-tetrafluorodichloroacetone at ordinary conditions is a substantially colorless liquid of composition $CClF_2.CO.CClF_2$ and having boiling point of about 44° C. This compound may be made for example by effecting reaction between anhydrous HF and hexachloroacetone at moderately elevated temperature while in the presence of antimony pentahalide and while maintaining the reaction mass substantially in the liquid phase, and thereafter recovering the $CClF_2.CO.CClF_2$ from the reaction products by suitable procedure such as distillation. U.S. Patent 2,741,634 discloses suitable procedure for making sym-tetrafluorodichloroacetone, $CClF_2.CO.CClF_2$.

Practice of the present invention comprises subjecting $CClF_2.CO.CClF_2$ to heating at substantially elevated temperatures while in the presence of bromine in quantity sufficient to react with a substantial amount of the said $CClF_2.CO.CClF_2$, and recovering perhalogenated bromofluoromethanes from the resulting reaction products. The substantially complete disunion of the carbon atoms of the sym-tetrafluorodichloroacetone by the action of bromine is believed to be summarized by—

$CClF_2.CO.CClF_2 + Br_2 \rightarrow 2CF_2ClBr + CO$
$CClF_2.CO.CClF_2 + Br_2 \rightarrow CF_2Br_2 + CCl_2F_2 + CO$ Temperatures employed in carrying out the invention reactions lie substantially in the range of 500–800° C., depending upon such factors as reaction completeness desired, and reaction or contact time, i.e. time during which each incremental portion of starting material and bromine are exposed to reaction conditions in the reactor. With reasonable reaction time, appreciable quantities of principal products and by-product form at the lower temperatures. At temperatures above about 800° C., no significant advantages result, and some decomposition is incipient. Best practice is effected in a preferred temperature range of about 550–700° C. Reactions are carried out preferably at atmospheric pressure, although sub- or superatmospheric pressures may be employed.

Minimum quantity of bromine employed may be any quantity enough to react with a substantial amount of $CClF_2.CO.CClF_2$ starting material. In usual practice, the amount of bromine utilized does not substantially exceed 1.5 mols per mol of $CCl_2F_2.CO.CClF_2$, it being noted that even with this amount of bromine, in most circumstances, recycling of some bromine may be found necessary. Preferably, relative molecular ratios of bromine and $CClF_2.CO.CClF_2$ charged to the reaction lie substantially in the range of 0.5–1.0 mol of bromine to one mol of $CClF_2.CO.CClF_2$. Contact time in the reactor may be substantially in the range of 1–25 seconds, although preferred contact times are substantially in the range of 3–15 seconds.

With regard to procedural aspects of practice of the invention, the $CClF_2.CO.CClF_2$ and bromine, may be either mixed in the desired proportions as a liquid mixture and vaporized as such into the reactor, or the reactants may be separately metered out and vaporized into the reactor. The reactor may be a tubular pipe made of quartz, or other suitable material resistant to action of bromine at high temperatures, and provided with external heating equipment preferably including automatic means for maintaining given temperatures in the reaction zone, and arranged for insertion of suitable thermocouples to determine internal reaction temperatures.

Reactor exit products may be handled by methods more or less conventional in this art. For example, reaction products may be condensed directly such as in water-cooled and Dry Ice-acetone traps, and the condensate fractionally distilled. Carbon monoxide passes out of the system as a gas. Any unreacted ketone and bromine may be recycled as are minor amounts of $CBrF_2CBrF_2$. Alternatively, products leaving the reactor may be water-washed at about room temperature to remove water-soluble constituents such as unreacted ketone and possible small amounts of acid halide, scrubbed with aqueous NaOH to remove entrained bromine, dried in $CaCl_2$ towers, condensed and fractionated.

In practice of one embodiment of the invention, the reactor employed was 1.25 inch I.D. quartz pipe providing a 30 inch reaction zone heated over its length by a tubular electric furnace. A liquid mixture consisting of 610 parts by weight of bromine and 810 parts of $CClF_2.CO.CClF_2$ ($Br_2$:$CClF_2.CO.CClF_2$ ratio .93:1.0) was evaporated at a substantially constant rate over a period of 2 hours into the reactor. Over the course of the reaction, internal temperature in the reactor was held in the range of 580° C. to a maximum of about 650° C. Average contact time was about 5 seconds. Reaction products leaving the reactor were washed successively with water and aqueous NaOH solution, dried by passage thru $CaCl_2$ towers, and condensed in the Dry-Ice acetone trap the tail gas exit of which discharges CO. The condensate in the trap was fractionally distilled and recoveries were: $CF_2ClBr$, B.P. minus 4° C., 464 parts; $CF_2Br_2$, B.P. 24.5° C., 253 parts; $CCl_2F_2$, B.P. minus 30° C., 278 parts; and 134 parts of still residue containing a substantial amount of $CF_2BrCF_2Br$, B.P. 47.6° C. Substantially all of the bromine and the $CClF_2.CO.CClF_2$ starting material reacted.

I claim:
1. The process which comprises subjecting

$CClF_2.CO.CClF_2$ to heating substantially in the range of 500–800° C. while in the presence of bromine in quantity sufficient to react with a substantial amount of said $CClF_2.CO.CClF_2$, and recovering perhalogenated bromofluoromethane from the resulting reaction products.

2. The process of claim 1 in which temperature is substantially in the range of 550–700° C.

3. The process of claim 1 in which the quantity of bromine does not substantially exceed 1.5 mols per mol of $CClF_2.CO.CClF_2$.

4. The process for making $CF_2BrCl$ and $CBr_2F_2$ which comprises subjecting $CClF_2.CO.CClF_2$ to heating substantially in the range of 500–800° C. while in the presence of bromine in quantity sufficient to react with a substantial amount of said $CClF_2.CO.CClF_2$, and recovering $CF_2BrCl$ and $CBr_2F_2$ from the resulting reaction products.

5. The process of claim 4 in which temperature is substantially in the range of 550–700° C.

6. The process of claim 4 in which the quantity of bromine does not substantially exceed 1.5 mols per mol of $CClF_2.CO.CClF_2$.

7. The process of claim 4 in which temperature is substantially in the range of 550–700° C., and relative molecular ratios of bromine and $CClF_2.CO.CClF_2$ charged to the reaction lie substantially in the range of 0.5–1.0 mol of bromine to one mol of $CClF_2.CO.CClF_2$.

References Cited in the file of this patent

UNITED STATES PATENTS

| | | |
|---|---|---|
| 2,647,933 | La Zerte et al. | Aug. 4, 1953 |
| 2,704,776 | Zerte et al. | Mar. 22, 1955 |
| 2,731,505 | Barnhart | Jan. 17, 1956 |
| 2,741,634 | Miller et al. | Apr. 10, 1956 |
| 2,755,314 | Reid et al. | July 17, 1956 |